United States Patent [19]

Yamaguchi et al.

[11] Patent Number: 4,805,164
[45] Date of Patent: Feb. 14, 1989

[54] DISC INCLINATION DETECTING APPARATUS

[75] Inventors: Hirohisa Yamaguchi; Kenichi Sato, both of Tokyo, Japan

[73] Assignee: TEAC Corporation, Tokyo, Japan

[21] Appl. No.: 94,113

[22] Filed: Sep. 8, 1987

[30] Foreign Application Priority Data

Sep. 9, 1986 [JP] Japan .................. 61-212008

[51] Int. Cl.$^4$ .................. G11B 3/90; G11B 27/36
[52] U.S. Cl. .................. 369/58; 369/258
[58] Field of Search .................. 369/58, 233, 258

[56] References Cited

U.S. PATENT DOCUMENTS

| | | | |
|---|---|---|---|
| 4,549,190 | 10/1985 | O'Hare | 346/108 |
| 4,602,359 | 7/1986 | Palmer | 369/58 |
| 4,682,314 | 7/1987 | Nakagaki | 369/44 |
| 4,710,908 | 12/1987 | Oshima | 369/32 |

Primary Examiner—William L. Sikes
Assistant Examiner—Robert E. Wise
Attorney, Agent, or Firm—Michael N. Meller

[57] ABSTRACT

A disc inclination detecting apparatus comprises a light-emitting element for projecting a light beam on a disc and a light-sensitive element for receiving a reflected light beam reflected by the disc and outputting a corresponding electric signal, in which the light-sensitive element faces the disc and is positioned together with the light-emitting element in a tangential direction of tracks on the disc. The apparatus also comprises a signal processing circuit for detecting, on the basis of the electric signal, a variation of a position of the reflected light beam on the light-sensitive element in a direction perpendicular to the tangential direction. The variation corresponds to an inclination angle of the disc.

9 Claims, 4 Drawing Sheets

DISC INCLINATION DETECTING APPARATUS

BACKGROUND OF THE INVENTION

The present invention generally relates to a disc inclination detecting apparatus, and in particular to a disc inclination detecting apparatus for detecting an inclination angle of an information recording disc upon recording or reproduction.

An optical disc is well known as an information recording disc. The optical disc is widely used as an information recording means of a high information recording density. However, the optical disc has difficulty in permanently maintaining its flat planes. In general, the relative height relationship between center and outer periphery parts of the disc varies, and the disc is thus distorted in the form of a dish. In particular, a disc with an air sandwiched type configuration is liable to have the inclination occurring at disc planes in inner and outer periphery parts having a spacer.

When recording information on a distorted disc, a spot of a light beam is deformed on an information recording surface of the disc, because the light beam cannot be perpendicularly projected thereon due to distortion of the disc. Therefore, there is the possibility that distorted pits are formed on the information recording surface and some pits are lacking. Deformation of the pits causes degradation of the frequency characteristic upon reproduction. The occurrence of inclination at the inner periphery part of the disc is a particularly serious problem where the disc is rotated so that an angular velocity of the disc is constant. On the other hand, upon reproduction, a beam of light which is emitted by a head or pickup and is reflected on the disc surface, does not return to the pickup accurately, so the reproduction of the recorded information is degraded.

In order to resolve the above problems, a disc inclination detecting apparatus has been proposed in the Japanese Patent Laid-Open No. 236,130/85, for example. This apparatus has a pair of a light-emitting element and a light-sensitive element which are located in the radial direction of the disc. A light beam emitted by the light-emitting element is reflected on the surface of the disc. A reflected light beam reaches the light-sensitive element, and moves on a light-sensitive surface of the light-sensitive element in a direction parallel to the axis of the disc, corresponding to the inclination of the disc. Then, the pickup is attitude-controlled by an attitude-controlling mechanism by the variation of the reflected light beam on the light-sensitive surface.

However, the conventional disc inclination detecting apparatus aforementioned has the following disadvantage. The reflected light beam moves on the light-sensitive surface in the direction parallel to the axis of the disc, even when the disc itself moves in the axial direction and correspondingly the distance between the surface of the disc and a pair of the light-emitting element and the light-sensitive element is varied. Therefore, the apparatus detects the movement of the disc in the axial direction as if the disc is inclined. It should be noted that this movement of the disc does not substantially affect the recording or reproducing operation.

SUMMARY OF THE INVENTION

Accordingly, it is a general object of the present invention to provide a novel and effective disc inclination detecting apparatus, in which the above described problem has been eliminated.

Another and more specific object of the present invention is to provide a disc inclination detecting apparatus comprising a light-emitting element for projecting a light beam on a disc and a light-sensitive element for receiving a reflected light beam reflected by the disc and outputting a corresponding electric signal, in which the light-sensitive element faces the disc and is positioned together with the light-emitting element in a tangential direction of tracks on the disc. The apparatus also comprises a signal processing circuit for detecting, on the basis of the electric signal, a variation of a position of the reflected light beam on the light-sensitive element in a direction perpendicular to the tangential direction. The variation corresponds to an inclination angle of the disc.

Other objects and further features of the present invention will be apparent from the following detailed description when read in conjunction with the attached drawings.

DETAILED DESCRIPTION

Description will first be given of a conventional disc inclination detecting apparatus with reference to FIG. 1.

Figure 1:
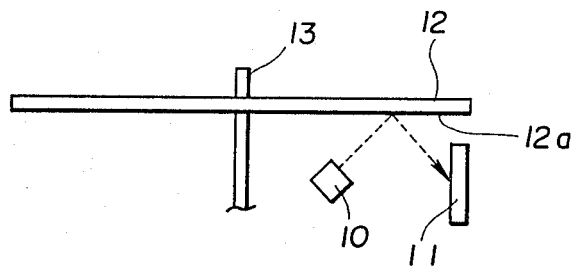
FIG. 1 is a side view of a conventional disc inclination detecting apparatus.

FIG. 1 shows the disc inclination detecting apparatus disclosed in the publication aforementioned. A pair of a light-emitting element 10 and a light-sensitive element 11 is positioned in the radial direction of a disc 12, which is fixed to a rotation axis 13 driven by a motor (not shown). A light beam is projected onto an information recording surface 12a of the disc 12 and is reflected thereon. A reflected light beam reaches the light-sensitive element 11. The reflected light beam moves on a light-sensitive surface of the light-sensitive element 11 in the perpendicular or axial direction, corresponding to the inclination of the disc 12.

In this configuration, when the disc 12 itself slightly moves upwards along the axis upon rotation, the reflected light beam correspondingly moves on the light-sensitive surface upwards. That is, the conventional configuration detects the movement of the disc in the axial direction as if the disc is inclined or distorted. The movement of the disc itself in the axial direction does not affect the reproducing operation, because a pickup or head (not shown) for reproduction projects the light beam perpendicularly on the information recording surface and receives the light beam reflected thereon.

Therefore, the present invention intends to detect only a true inclination of the disc.

Description will now be given of a disc inclination detecting apparatus of a first embodiment according to the present invention.

Figure 2A:
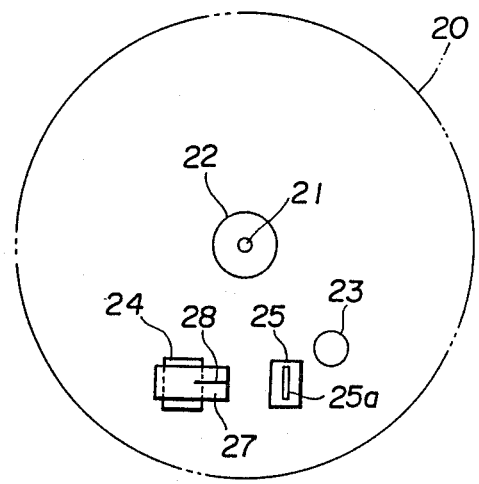
FIGS. 2(A) and 2(B) are respectively a plan view and a side view of a disc inclination detecting apparatus of a first embodiment according to the present invention.
Figure 2B:
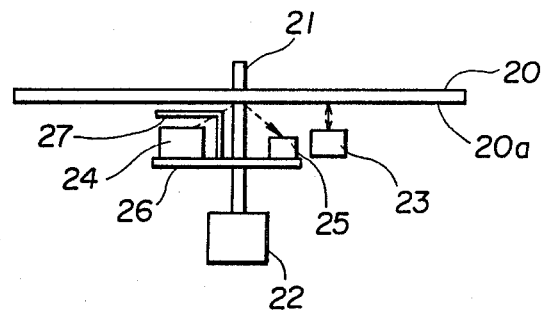
Figure 3:
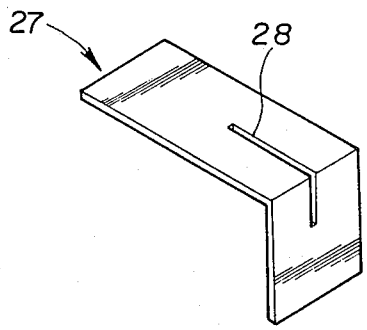
FIG. 3 is a perspective view of a slit plate used in the first embodiment shown in FIGS. 2(A) and 2(B)

Referring FIGS. 2(A) and 2(B), an optical disc 20 is fixed to a rotating axis 21, to one extreme end of which is attached a motor 22. The motor 22 drives the axis 21 so that the disc 20 is rotated at a constant speed of the rotation. The disc 20 has an information recording surface 20a, which is formed on its lower surface. A pickup or head 23, which faces the information recording surface 20a, projects a light beam thereon in the axial direction and receives a reflected light beam. The pickup 23 is attitude-controlled by an attitude controlling mechanism (not shown) in accordance with an error voltage $V_{ER}$ which the present invention outputs as will be described later.

A pair of a light-emitting element 24 and a light-sensitive element 25 is mounted on a substrate 26 so as to be arranged in a tangential direction of tracks formed on the information recording surface 20a. In the arrangement illustrated in FIG. 2(A), the pair of the light-emitting element 24 and the light-sensitive element 25 is located in a tangential direction of tracks in an intermediate peripheral region of the information recording surface 20a. Of course, it is also possible to arrange them in a tangential direction of tracks in an inner periphery region or an outer periphery region. A slit plate 27 is provided between the light-emitting element 24 and the disc 20. The slit plate 27 has a substantially L-shape and a slit 28 formed at a corner part thereof. One edge of the slit plate 27 is mounted on the substrate 26 so that slit 28 is oriented in the tangential direction. In addition, it is preferable to position the slit plate 27 so that the slit 28 is close to the information recording surface 20a in order to obtain a fine and long light beam. The slit plate 27 is used when a light-emitting diode is employed as the light-emitting element 24. The light beam emitted by the light-emitting diode is formed into a fine and long light beam extending in the tangential direction by the action of the slit 28 and is then projected onto the information recording surface 20a. The light beam reflected on the information recording surface 20a is received by the light-sensitive element 25.

The light-sensitive element 25 may be formed by a one-dimensional charge-coupled device having a light-sensitive surface 25a of a long and narrow shape. The light-sensitive element 25 is positioned so as to be perpendicular to the slit 28 of the slit plate 27. Therefore, an incident light beam 37 (FIG. 4) on the light-sensitive surface 25a moves thereon in its longitudinal direction of an arrow $A_1$ shown in FIG. 4, when the disc 20 is inclined. Also, when the disc 20 itself moves in the axial direction and therefore the distance between the disc 20 and the pair of the light-emitting element 24 and the light-sensitive element 25 is varied, the incident light beam 37 on the light-sensitive surface 25a moves thereon in its width direction of an arrow $A_2$ shown in FIG. 4. However, it should be noted that in the latter case, the light-sensitive surface 25a does not detect any change of the incident light beam, because the length of the narrow incident light beam extending in the width direction of the light-sensitive surface 25a is sufficiently longer than the width of the light-sensitive surface 25a.

Figure 4:
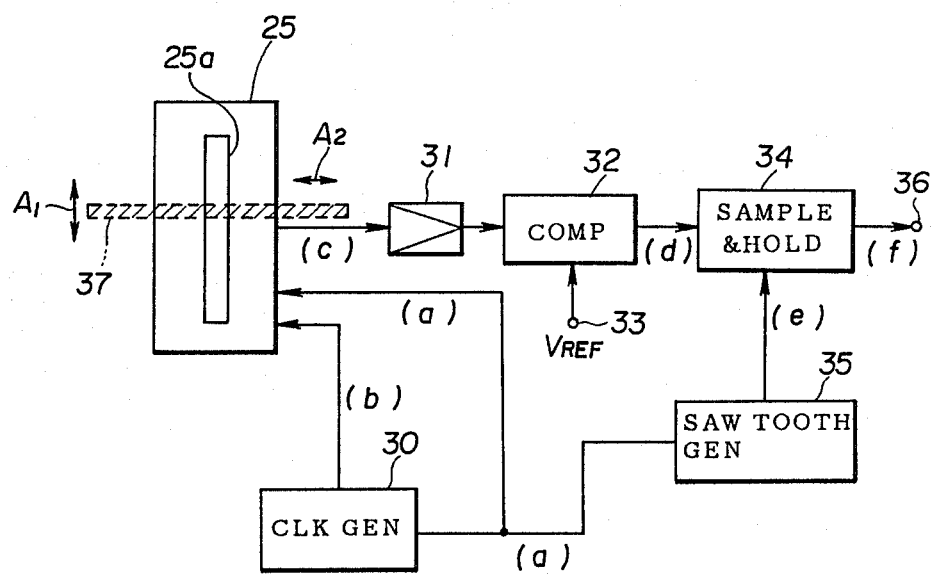
FIG. 4 is a block diagram of a signal processing circuit used in the present invention.
Figure 5:
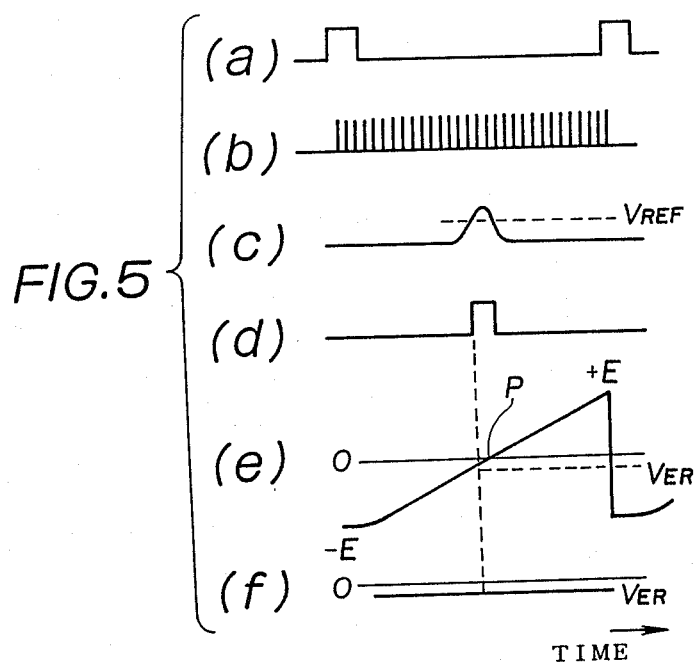
FIG. 5 shows waveforms of signals at parts of the block diagram shown in FIG. 4.

FIG. 4 is a block diagram of a signal processing circuit for processing a signal from the light-sensitive element 25 and producing an error voltage $V_{ER}$ representing an inclination angle of the disc 20. A clock generator 30 generates reference pulses shown in FIG. 5(a) as well as transfer pulses shown in FIG. 5(b). The pulse separation between adjacent two reference pulses corresponds to the length of the light-sensitive surface 25a of the one-dimensional charge-coupled device forming the light-sensitive element 25. The reference pulses and the transfer pulses are fed to the light-sensitive element 25. The light-sensitive element 25 begins transferring an electric signal which is formed by the photoelectric transfer in synchronization with the trailing edge of each reference pulse, and then transfers the electric signal in response to each transfer pulse. Therefore, an electric signal as shown in FIG. 5(c) is outputted from the light-sensitive element 25. The output signal of the light-sensitive element 25 is amplified by an amplifier 31 and is fed to a comparator 32. The comparator 32 compares the output signal of the amplifier 31 with a reference level $V_{REF}$ applied at a terminal 33 and provides a sample-hold circuit 34 with a sampling pulse as shown in FIG. 5 (d). A saw tooth wave generator 35 receives the reference pulse shown in FIG. 5(a) which is derived from the clock generator 30, and generates a saw tooth wave shown in FIG. 5(e). The sample-hold circuit 34 samples and holds the saw tooth wave in the range from the level $-E$ to the level E in response to the sampling pulse from the comparator 32, and outputs an error voltage $V_{ER}$ shown in FIG. 5(f) at an output terminal 36. The level and pole of the error voltage $V_{ER}$ indicate the angle and the direction of the inclination, respectively. Then, the pickup 23 is attitude-controlled corresponding to the error voltage $V_{ER}$ by means of the attitude controlling mechanism (not shown). In the above operation, when the disc 20 has no inclination, the front edge of the sampling pulse shown in FIG. 5(d) corresponds to an intersection P of a zero level of the saw tooth wave, as shown in FIG. 5(e). Therefore, the sample-hold circuit 34 outputs zero volt of the error voltage $V_{ER}$. Also, even when the disc 20 moves in the axial direction, the sample-hold circuit 34 outputs zero volt of the error voltage $V_{ER}$, because the incident light beam on the light-sensitive surface 25a moves only in the direction of the arrow $A_2$.

Figure 6A:
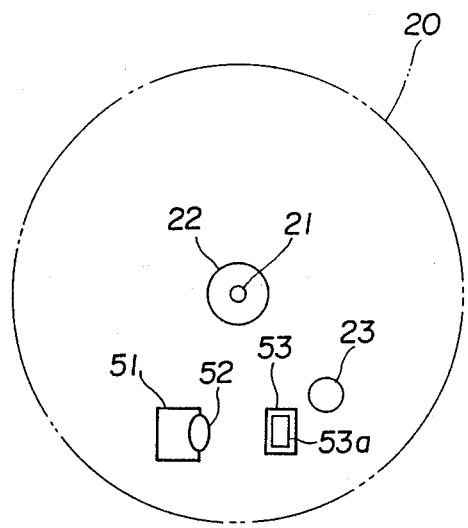
FIGS. 6(A) and 6(B) are respectively a plan view and a side view of a disc inclination detecting apparatus of a second embodiment according to the present invention.
Figure 6B:
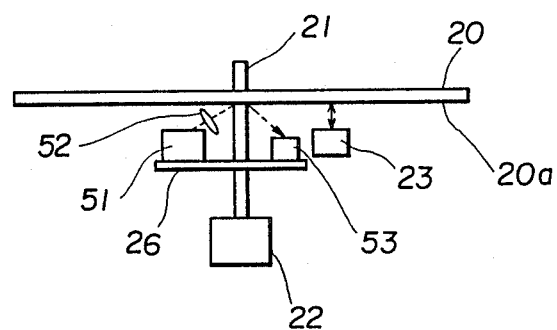

FIGS. 6(A) and 6(B) are respectively a plan view and a side view of a disc inclination detecting apparatus of a second embodiment according to the present invention. One of the essential features of the second embodiment is to replace the light-emitting diode of the light-emitting element 24 with a laser diode 51. Since the convergence of the laser diode is very high, the slit plate 27 is replaced with a lens 52, which is positioned between the laser diode 51 and the information recording surface 20a. That is, the lens 52 focuses the light beam emitted by the laser diode 51 on the information recording surface 20a. The reflected light beam is projected onto a light-sensitive element 53. When the disc 20 itself moves in the axial direction, the incident light beam on a light-sensitive surface 53a of the light-sensitive element 53 moves in the width direction thereof. In this case, since the light beam is projected onto the light-sensitive surface 53a in the form of the spot, it is necessary to use the light-sensitive element 53 whose light-sensitive surface 53a has a width enough for the spot to be always positioned within the light-sensitive surface 53a even when the spot moves on the light-sensitive surface 53a in its width direction resulting from the whole movement of the disc 20 in the axial direction. The other configurations of the second embodiment other than those mentioned above are the same as the configurations of the first embodiment described in the foregoing.

Figure 7:
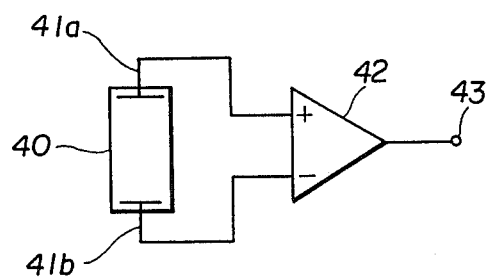
FIG. 7 is a circuit diagram of another signal processing circuit used in the present invention.

FIG. 7 shows a variation of the signal processing circuit shown in FIG. 4. One of the essential features of the variation is to replace the charge-coupled device of the light-sensitive element 25 with a semiconductor position-sensitive detector 40 for detection of one-dimensional position. The position-sensitive detector, which is available in the market, is formed by a N-layer, I-layer and P-layer deposited in sequence on a plate-shaped silicon. Two electrodes 41a and 41b are deposited on an upper surface of the P-layer. The incident light on the position-sensitive detector 40 is photoelectrically converted, and a current corresponding to the incident light is divided into two current components, one of which is outputted at the electrode 41a and the other is outputted at the electrode 41b. A differential amplifier 42 outputs a difference voltage (error voltage) between the two input signals at an output terminal 43. The variation in FIG. 7 is simpler than the configuration in FIG. 4.

The present invention is not limited to the embodiments, but various variation and modification may be made without departing from the scope of the present invention.

What is claimed is:

1. A disc inclination detecting apparatus adapted to a recording and/or reproducing apparatus for an information recording disc, said disc inclination detecting apparatus comprising:
   light-emitting means for projecting a light beam on said disc;
   light-sensitive means for receiving a reflected light beam reflected by said disc and outputting a corresponding electric signal, said light-sensitive means facing said disc and being positioned together with said light-emitting means in a tangential direction of tracks on said disc; and
   signal processing means for detecting, on the basis of said electric signal, a variation of a position of said reflected light beam on said light-sensitive means in a direction perpendicular to said tangential direction, said variation corresponding to an inclination angle of said disc.

2. A disc inclination detecting apparatus as claimed in claim 1, wherein said apparatus further comprises a slit plate which is positioned between said light-emitting means and said disc, said slit plate having a long and narrow slit oriented in said tangential direction.

3. A disc inclination detecting apparatus as claimed in claim 1, wherein said signal processing means includes comparator for comparing said electric signal with a reference signal, a saw tooth generator for generating a saw tooth signal, and a sample-hold circuit for sampling said saw tooth signal in response to a comparison result in said comparator and holding a sampled saw tooth signal, so that said sampled saw tooth signal is outputted as said variation corresponding to said inclination of said disc.

4. A disc inclination detecting apparatus as claimed in claim 1, wherein said light-emitting means is a light-emitting diode.

5. A disc inclination detecting apparatus as claimed in claim 1, wherein said light-sensitive means is a one-dimensional charge-coupled device which is positioned in the direction perpendicular to said tangential direction.

6. A disc inclination detecting apparatus as claimed in claim 1, wherein said light-emitting means is a laser diode.

7. A disc inclination detecting apparatus as claimed in claim 6, wherein said disc inclination detecting apparatus comprises a lens for focusing said light beam emitted by said laser diode on said disc.

8. A disc inclination detecting apparatus as claimed in claim 1, wherein said light-sensitive means is a semiconductor position-sensitive detector for detecting one-dimensional positions.

9. A disc inclination detecting apparatus as claimed in claim 8, wherein said signal processing means is a differential amplifier for differential-amplifying output signals of said semiconductor position-sensitive detector, so that a difference signal is outputted as said variation of said disc.

* * * * *